No. 760,181. Patented May 17, 1904.

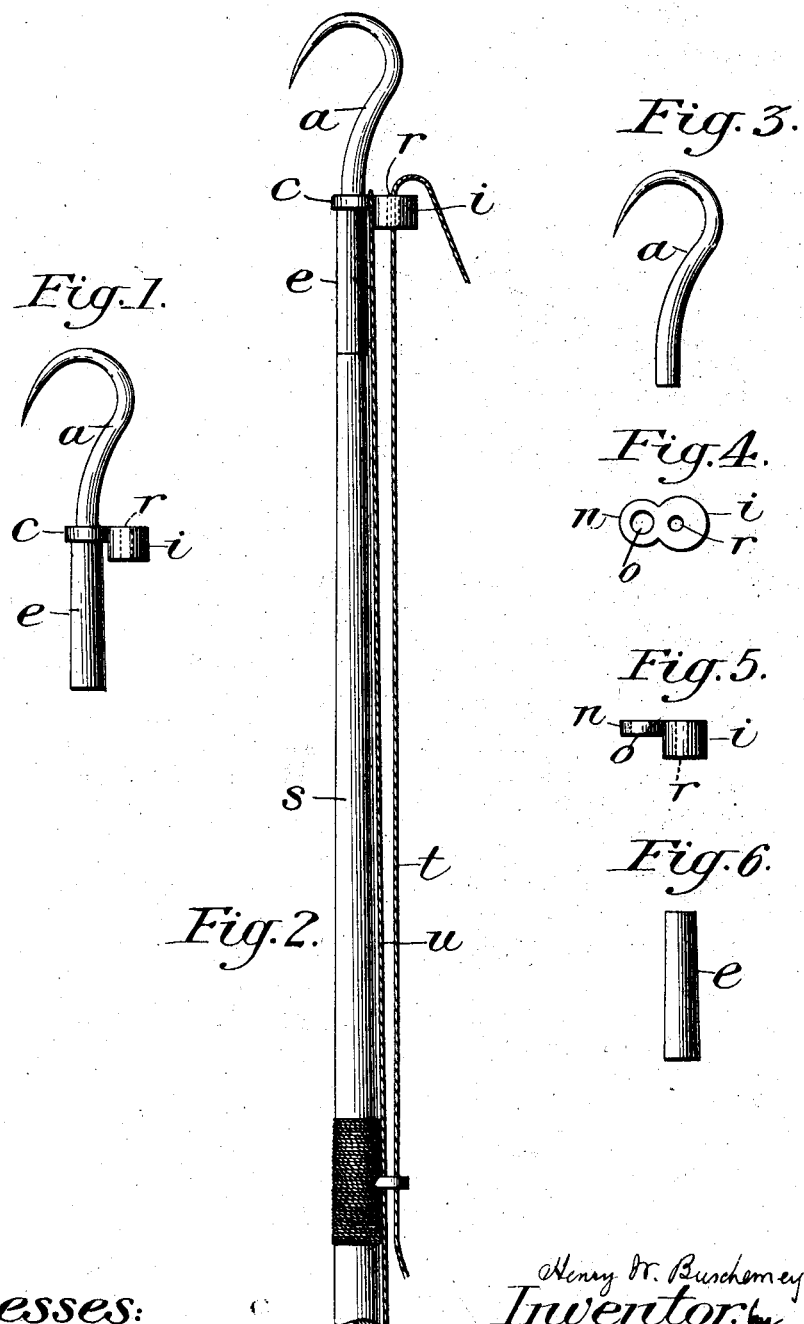

UNITED STATES PATENT OFFICE.

HENRY W. BUSCHEMEYER, OF LOUISVILLE, KENTUCKY.

FISHING-ROD.

SPECIFICATION forming part of Letters Patent No. 760,181, dated May 17, 1904.

Application filed April 27, 1903. Serial No. 154,561. (No model.)

*To all whom it may concern:*

Be it known that I, HENRY W. BUSCHE-MEYER, a citizen of the United States, residing in the city of Louisville, county of Jefferson, and State of Kentucky, have invented a new and useful article—namely, an Improvement in Fishing-Rods—of which the following is a specification.

My invention relates to a contrivance attached to the rod, which I call a "landing-hook and releaser," by which a fish caught on the line can be landed and which is to take the place of a separate landing-net or of a gaff-hook, such as are now in use, which must be carried in another hand from the rod or even by another person. Moreover, the use of the landing-hook, as shown below, makes it unnecessary ever to hold the rod in such a position as to bring the strain of the fish to bear on the tip, whereby it is often broken. The hook may also be convenient for other purposes, such as retrieving the tip of the rod if it should break off, as it is attached to a separate cord, also for hanging the rod to a fence or tree, and the ring encircling the ferrule of the rod, which is part of my contrivance, strengthens the hold of the ferrule, and thus protects the ferrule and the tip against splitting. I attain these ends by the mechanism illustrated in the accompanying drawings, in which—

Figure 1 shows the landing-hook, the ferrule, and the double ring connecting them separately. Fig. 2 gives a front view of the top joint of the rod, with the attachment and part of the line. Fig. 3 shows the hook proper. Fig. 4 shows the double ring connecting this hook to the ferrule in a horizontal view; Fig. 5, the same in the vertical view; Fig. 6, the ferrule, which sits on the tip of the rod and into which the landing-hook is fitted.

The same letters occurring in the several figures denote the same parts.

In Fig. 1, $a$ is the landing-hook, made of steel or like metal. It is curbed at the top, and its point comes downward and slightly outward, as shown in the figure. $c\,i$ is a double ring, cast or wrought in one piece, whereof the part $c$ encircles the ferrule of the rod, while $i$, which is thicker than $c$, is connected with $c$ by a very short bar. In $i$ the hole marked $r$ receives the line, as shown in Fig. 2. The part $c$ is the ferrule, made of silver, German silver, or other metal softer than steel. It is open and at its top by a screw-thread or otherwise receives into itself the foot of hook, while at its lower end it encircles the tip of the rod.

Fig. 2 shows the top joint of the rod (marked $s$) a cord $u$, which runs alongside the rod up to the double ring $c\,i$ and is tied around the bar, connecting its two parts, so as to hold it if the tip of the rod should break off. It shows also the line marked $t$, which at $r$ runs through the outward section of the double ring.

Figs. 3, 4, 5, and 6 need no further explanation than is given above. When a fish is caught on the line and having been played more or less is ready to be landed, the line is grasped in one hand and the hook at the end of the rod is passed along the line till the point of the hook enters the flesh of the fish, and the fisherman by pulling the rod can bring the fish to land. Sometimes it may suffice to grapple the line near the fish with the landing-hook and then to pull home.

It will be seen that the angling-line in my rod is led through a ring fastened to its side, while in the rods now in common use the line runs through a hole or duct in the tip of the rod.

What I claim as my invention, and wish to secure by Letters Patent, is—

1. A hook having a sharp point turned downward and slightly outward, attached to the upper end of a fishing-rod, in combination with a double ring of which one half encircles the rod near its upper end, while the other half serves as a runner for the line, and with a cord fastening the double ring to the lower part of the rod, substantially as shown in the drawings and specification.

2. A hook having a sharp point turned downward and slightly outward attached to the upper end of a fishing-rod, in combination with a double ring of which one half encircles the rod near its upper end, while the other half serves as a ruuner for the line, substantially as shown in the drawings and specification.

3. A hook having a sharp point turned downward and slightly outward attached to the upper end of a fishing-rod, in combination with a ring affixed to the rod near its end to serve as a runner for the line, substantially as shown in the drawings and specification.

HENRY W. BUSCHEMEYER.

Witnesses:
LEWIS N. DEMBITZ,
JOS. E. CONKLING.